United States Patent
Lee et al.

(10) Patent No.: US 8,366,180 B2
(45) Date of Patent: Feb. 5, 2013

(54) VEHICLE AIR DEFLECTION SYSTEM

(75) Inventors: Sang Sig Lee, Chula Vista, CA (US); Jong Seog Lee, Chula Vista, CA (US)

(73) Assignee: Hyundai Translead, San Diego, CA (US)

( * ) Notice: Subject to any disclaimer, the term of this patent is extended or adjusted under 35 U.S.C. 154(b) by 0 days.

(21) Appl. No.: 13/114,726

(22) Filed: May 24, 2011

(65) Prior Publication Data

US 2012/0091754 A1   Apr. 19, 2012

Related U.S. Application Data

(60) Provisional application No. 61/392,539, filed on Oct. 13, 2010.

(51) Int. Cl.
*B62D 35/02* (2006.01)
(52) U.S. Cl. .................................................. 296/180.4
(58) Field of Classification Search .............. 296/180.1, 296/180.2, 180.3, 180.4, 180.5; 180/903; 105/1.1
See application file for complete search history.

(56) References Cited

U.S. PATENT DOCUMENTS

| | | | |
|---|---|---|---|
| 4,746,160 A | 5/1988 | Wiesemeyer | |
| 5,280,990 A | 1/1994 | Rinard | |
| 6,644,720 B2 * | 11/2003 | Long et al. | 296/180.4 |
| 6,874,842 B2 * | 4/2005 | Hojna | 296/180.1 |
| 7,093,889 B2 * | 8/2006 | Graham | 296/180.4 |
| 7,497,502 B2 * | 3/2009 | Wood | 296/180.4 |
| 7,578,541 B2 | 8/2009 | Layfield et al. | |
| 7,686,385 B2 | 3/2010 | Dolan et al. | |
| 7,748,772 B2 | 7/2010 | Boivin et al. | |
| 7,871,121 B1 * | 1/2011 | Ragsdale | 296/180.2 |
| 7,887,120 B2 | 2/2011 | Boivin et al. | |
| 7,938,475 B2 * | 5/2011 | Boivin et al. | 296/180.4 |
| 7,942,466 B2 | 5/2011 | Reiman et al. | |
| 7,950,721 B1 * | 5/2011 | Peterson | 296/180.4 |
| 8,177,286 B2 * | 5/2012 | Brown et al. | 296/180.4 |
| 2006/0152038 A1 * | 7/2006 | Graham | 296/180.1 |
| 2008/0296930 A1 * | 12/2008 | Roush et al. | 296/180.4 |
| 2009/0212595 A1 | 8/2009 | Heppel et al. | |
| 2010/0264691 A1 * | 10/2010 | Giromini et al. | 296/180.4 |
| 2011/0062749 A1 * | 3/2011 | Graham et al. | 296/180.4 |
| 2011/0204677 A1 * | 8/2011 | Wood et al. | 296/180.1 |
| 2011/0285167 A1 * | 11/2011 | Butler | 296/180.1 |
| 2012/0032475 A1 * | 2/2012 | Grandominico et al. | 296/180.4 |
| 2012/0074728 A1 * | 3/2012 | Senatro | 296/180.4 |

* cited by examiner

*Primary Examiner* — H Gutman
(74) *Attorney, Agent, or Firm* — Wood, Phillips, Katz, Clark & Mortimer

(57) ABSTRACT

An air deflection system has a first skirt assembly mounted to a vehicle at a first side of a cargo container thereon. The first skirt assembly has at least one upper panel and at least one lower panel each extending in a front-to-rear direction and having laterally facing air deflecting surfaces. The at least one lower panel is constructed to be more readily bendable than the at least one upper panel. The air deflection system further has a plurality of support braces extending angularly between: a) the underside of a vehicle to which the skirt assembly is operatively mounted; and b) the at least one upper panel to support the skit assembly on an associated vehicle and reinforce the at least one upper panel.

24 Claims, 11 Drawing Sheets

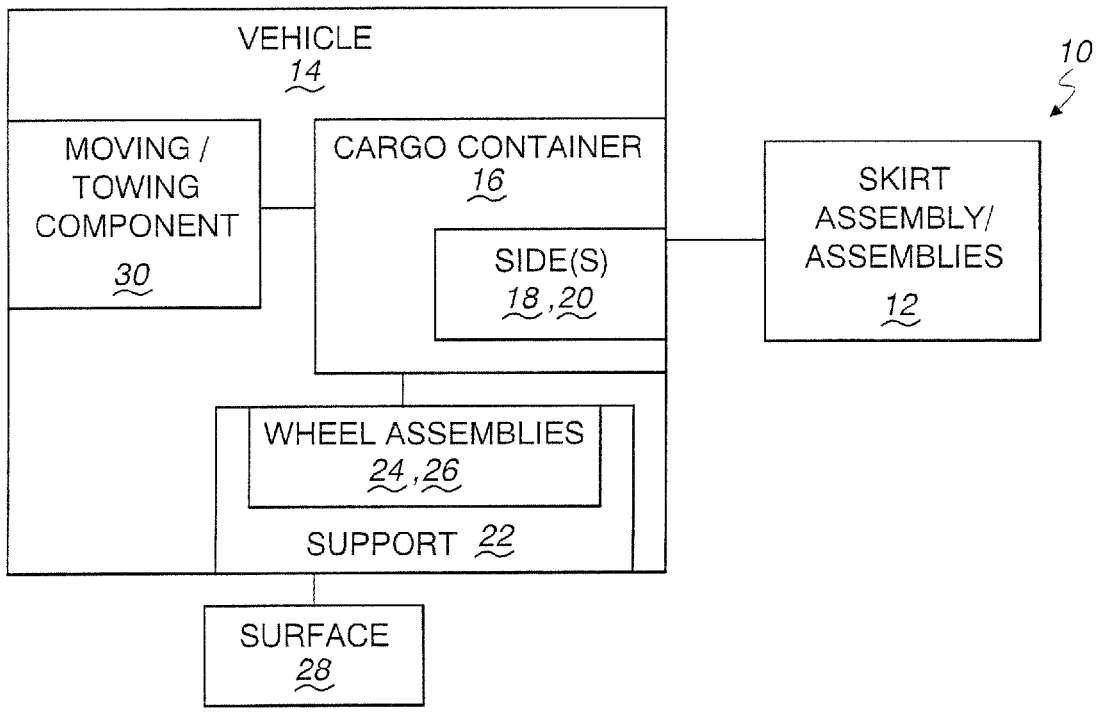

VEHICLE AIR DEFLECTION SYSTEM

CROSS-REFERENCE TO RELATED APPLICATIONS

This application is a non-provisional of U.S. Ser. No. 61/392,539, filed Oct. 13, 2010.

BACKGROUND OF THE INVENTION

1. Field of the Invention

This invention relates to air deflection systems and, more particularly, to air deflection systems used to control air movement at the underside region of vehicles.

2. Background Art

Ground transportation industries are becoming increasingly concerned about maximizing fuel efficiency for their vehicles. Rising fuel costs and diminishing profit margins have motivated particularly the trucking industry to seek alternative, fuel-efficient designs, particularly for semi-trailers. Environmental concerns focused on emissions and anticipated future government fuel efficiency regulations have also been instrumental in motivating such redesigns.

Given the relatively generic configuration of semi-trailers, and the large number of such vehicles already in use, the industry has focused heavily on retrofitting such vehicles with air deflection systems that will improve their aerodynamic properties. For decades, semi-trailers have incorporated convex deflectors to bridge the region between the upper surface of the towing unit and the front wall of the trailer extending above the towing unit. In the absence of this structure, the trailer presents a flat, forwardly facing wall surface that is in a plane generally perpendicular to the travel direction. As a result, in the absence of some air deflection structure, this trailer region produces a significant amount of drag that accounts for an appreciable loss of fuel efficiency.

Another region of such vehicles that accounts for poor aerodynamic properties is at the trailer sides between the rear wheel assembly and the wheel assembly on the towing vehicle. In the absence of some type of air deflection structure, air tends to be drawn by vacuum into the space beneath the cargo container. This air diversion prevents the maintenance of a laminar air flow along the full lengthwise extent of the trailer. The diverted air pattern also acts against the rear wheel assembly, the underside of the cargo container, and other components, that results in additional, unwanted drag. Typically, none of these components at the underside of the cargo container is designed with aerodynamic properties as a focus.

It is known to incorporate air deflection systems, in the form of side skirts, on semi-trailers. While the incorporation of these side skirts is desired, their use is practical only if they can be installed and maintained in an economically feasible manner.

If the process for installing the skirts is time consuming and difficult, operators may opt to leave these structures off. Inherently, these structures are installed with a relatively high degree of difficulty by reason of their size. If each side is installed as a single lengthwise unit, several individuals may be required to support the same and work together to secure it to the trailer. While construction of each side skirt with multiple joinable pieces may obviate this problem, it introduces other problems by requiring potentially more complicated structures and more complicated assembly steps as the individual components are joined together.

Side skirts must also be positively held in place. The release of part or all of the skirt structure during vehicle operation could endanger individuals in the vicinity of the semi-trailer or other vehicle operators.

At the same time, these skirt assemblies must have the ability to withstand potentially high wind loading and absorb impacts from road hazards, other vehicles, or any other encountered object. To effectively control air flow, the skirts must depend from the bottom of the cargo container into relatively close proximity to the ground. This makes the skirts prone to intercepting foreign objects that commonly find their way onto roadways. As a result, some level of flexibility and resistance to breakage must be incorporated into these designs.

It is known to construct the skirt assemblies with joined upper and lower components, with the former being more rigid for mounting and latter more flexible to deform without breaking under anticipated impacts. In the absence of some accommodation for this condition, part or all of the side skirt may break loose, again thereby posing a danger to those in the vicinity of the vehicle.

From the onset, use of side skirt assemblies is a realistic possibility only if they can be made relatively economically while remaining intact without a significant investment in maintenance or concern about failure. If the original design is relatively expensive, one must weigh the advantages of using a side skirt assembly versus operating the vehicle with less than desired aerodynamic properties.

The industry continues to seek out such side skirt assemblies that can be purchased and maintained economically, are capable of being installed without a high level of difficulty or expense, effectively divert air flow, and are not prone to failing under normal operating conditions.

SUMMARY OF THE INVENTION

In one form, the invention is directed to the combination of a vehicle and an air deflection system. The vehicle has: a cargo container with a front, a rear, a top, a bottom, and laterally spaced first and second sides; and a support for the cargo container consisting of first and second wheel assemblies spaced from each other in a front-to-rear direction. The support maintains the cargo container in an elevated position relative to a subjacent supporting surface for the vehicle so that there are first and second spaced regions between: a) the first and second wheel assemblies; and b) the bottom of the cargo container and subjacent supporting surface, respectively at the first and second sides of the cargo container. The air deflection system includes a first skirt assembly mounted to the vehicle at the first side of the cargo container. The first skirt assembly consists of at least one upper panel extending in a front-to-rear direction and defining an upper laterally facing deflecting surface, and at least one lower panel extending in a front-to-rear direction below the at least one upper panel and defining a lower laterally facing deflecting surface. The upper and lower laterally facing deflecting surfaces block air flow in a lateral direction into the first region. The at least one lower panel is constructed to be more readily bendable than the at least one upper panel so that with the first skirt assembly in an operative position the at least one lower panel will deflect upon being impacted with a predetermined force relative to the at least one upper panel. The air deflection system further includes a plurality of support braces extending angularly between: a) the vehicle at a first location spaced laterally inwardly from the first side at the bottom of the cargo carrying container; and b) the at least one upper panel to support the first skirt assembly in the operative position and reinforce the at least one upper panel.

In one form, the at least one upper panel has a vertical dimension and the plurality of support braces each has a first support brace having a flat body with oppositely facing first and second flat surfaces. The at least one upper panel has a laterally inwardly facing surface and the first support brace is secured to the at least one upper panel with the first flat surface on the body of the first support brace engaged with the laterally inwardly facing surface of the at least one upper panel over a majority of the vertical dimension of the at least one upper panel to thereby reinforce the at least one upper panel.

In one form, the first skirt assembly has at least one connector for joining the at least one upper panel and the at least one lower panel. The at least one connector defines a first receptacle bounded by a first upwardly extending leg and a second receptacle bounded by a first downwardly extending leg. The first skirt assembly further includes a first fastener that extends at least partially through each of the first support brace, the first upwardly extending connector leg and the at least one upper panel. A second fastener extends at least partially through each of the first support brace, the first downwardly extending connector leg and the at least one lower panel.

In one form, the connector viewed in cross section has an "H" shape with: a) an upwardly opening receptacle bounded by the first upwardly extending leg and a second upwardly extending leg and into which the at least one upper panel is directed; and b) a downwardly opening receptacle bounded by the first downwardly extending leg and a second downwardly extending leg and into which the at least one lower panel is directed.

In one form, the first fastener extends into the second upwardly extending connector leg and the second fastener extends into the second downwardly extending connector leg.

In one form, the cargo container has a plurality of laterally extending reinforcing beams each with a flange. The plurality of support braces includes first and second support braces respectively having first and second clamp assemblies. The first and second clamp assemblies each includes first and second relatively movable parts. The first clamp assembly parts are engagable one each with a flange on respective first and second spaced reinforcing beams to cooperatively releasably hang the first skirt assembly in the operative position, whereupon the second clamp assembly parts can be moved relative to the respective first clamp assembly parts to captively engage respective flanges on the first and second reinforcing beams to thereby maintain the first skirt assembly in the operative position.

In one form, the first support brace has a single piece that defines the first clamp assembly part and engages the at least one upper panel.

In one form, the first clamp assembly part has a U-shaped portion that opens generally horizontally to wrap around a respective flange on the first reinforcing beam.

In one form, the at least one upper panel has a top and bottom. The plurality of support braces includes a first support brace having a portion that extends angularly between the first location and the at least one upper panel adjacent to the top of the at least one upper panel.

In one form, the vehicle has a plurality of laterally extending reinforcing beams and the first skirt assembly includes a first elongate mounting component with a length that extends in a front-to-rear direction. The first elongate mounting component connects to a plurality of the reinforcing beams and to the at least one upper panel.

In one form, the at least one upper panel has a top and bottom. The first elongate mounting component has angled first and second generally flat walls. The first wall is connected to a plurality of the reinforcing beams and the second wall is connected to the at least one upper panel at the top of the at least one upper panel.

In one form, the first and second walls on the first elongate mounting component respectively have first and second free edges. The plurality of support braces includes a first support brace that has a portion that projects angularly between the vehicle and at least one upper panel adjacent each of the first and second free edges.

In one form, the vehicle includes a landing gear assembly that is offset laterally inwardly from each of the first and second sides of the cargo carrying container and the first skirt assembly is connected to the landing gear assembly.

In one form, the at least one upper panel and at least one lower panel are shaped to extend progressively laterally inwardly in a rear-to-front direction toward the landing gear assembly.

In one form, the first skirt assembly includes at least one elongate connector having a length extending in a front-to-rear direction. The at least one connector is joined to each of the at least one upper panel and the at least one lower panel, and is made from a non-metal material.

In one form, the air deflector system further includes a second skirt assembly that is the same as the first skirt assembly mounted to the vehicle at the second side of the cargo carrying container.

In one form, each of the at least one upper panel and at least one lower panel is made from a non-metal material.

In one form, the at least one upper panel and at least one lower panel each has a length extending in a front-to-rear direction and a vertical extent. The at least one lower panel and at least one upper panel each has a substantially constant vertical extent over a majority of their respective lengths and the vertical extent of the at least one upper panel is greater than the vertical extent of the at least one lower panel.

In one form, the invention is directed to a skirt assembly for a vehicle having a cargo container with a bottom and laterally spaced sides and a support including first and second wheel assemblies spaced from each other in a front-to-rear direction that maintain the cargo container in an elevated position relative to a subjacent supporting surface. The skirt assembly is mountable in an operative position to the cargo container to block air flow at a first region at one of the sides of the cargo container between: a) the bottom of the cargo container and subjacent supporting surface; and b) the first and second wheel assemblies. The skirt assembly includes: i) at least one upper panel extending in a front-to-rear direction and defining an upper laterally facing deflecting surface; and ii) at least one lower panel extending in a front-to-rear direction below the at least one upper panel and defining a lower laterally facing deflecting surface. The upper and lower laterally facing deflecting surfaces block air flow in a lateral direction into the first region of an associated cargo container. The at least one lower panel is constructed to be more readily bendable than the at least one upper panel so that with the first skirt assembly in an operative position on a cargo container the at least one lower panel will deflect upon being impacted with a predetermined force relative to the at least one upper panel. The air deflection system further includes a plurality of support braces each configured to angularly extend between: a) a first location on a cargo container on which the first skirt assembly is in the operative position spaced laterally inwardly from the first side at the bottom of the cargo container; and b) the at least one upper panel to support the skirt assembly in the operative position upon the cargo container and reinforce the at least one upper panel.

In one form, the at least one upper panel has a vertical dimension. The plurality of support braces includes a first support brace having a flat body with oppositely facing first and second flat surfaces. The at least one upper panel has a laterally inwardly facing surface. The first support brace is secured to the at least one upper panel with the first flat surface on the body of the first support brace engaged with the laterally inwardly facing surface of the at least one upper panel over a majority of the vertical dimension of the at least one upper panel to thereby reinforce the at least one upper panel.

In one form, the cargo container has a plurality of laterally extending reinforcing beams each with a flange. The plurality of support braces includes first and second support braces respectively having first and second clamp assemblies. The first and second clamp assemblies each includes first and second relatively movable parts. The first clamp assembly parts are engagable one each with a flange on respective first and second spaced reinforcing beams to cooperatively releasably hang the first skirt assembly in the operative position, whereupon the second clamp assembly parts can be moved relative to the respective first clamp assembly parts to captively engage the flanges on the first and second reinforcing beams to thereby maintain the first skirt assembly in the operative position.

BRIEF DESCRIPTION OF THE DRAWINGS

FIG. 1 is a schematic representation of a vehicle with a cargo container having skirt assemblies, according to the invention, operatively mounted at the sides thereof;

FIG. 2 is a rear perspective view of one exemplary form of vehicle, as shown in FIG. 1, with the inventive side skirt assemblies operatively mounted thereon;

DETAILED DESCRIPTION OF THE PREFERRED EMBODIMENT

Figure 3:
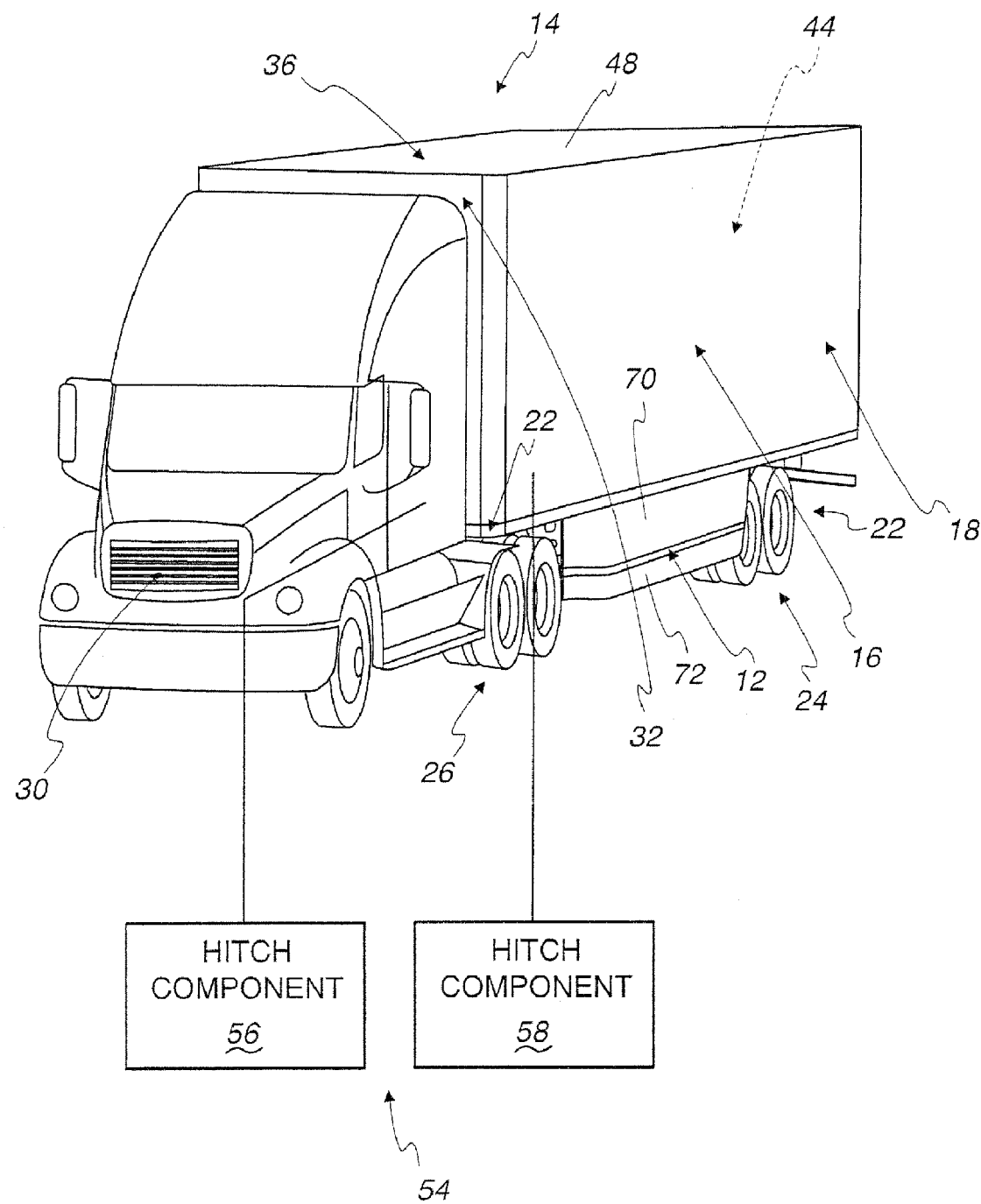
FIG. 3 is a view of the vehicle in FIG. 2 from a front perspective.

As depicted generically in FIG. 1, the present invention is directed to an air deflecting system at 10 made up of one or more skirt assemblies 12 that are operatively mounted to a vehicle 14 to improve the aerodynamic characteristics of the vehicle 14.

The vehicle 14 consists of a cargo container 16 with laterally spaced sides 18, 20. A support 22 for the cargo container 16 consists of separate wheel assemblies 24, 26 on the vehicle 14 spaced from each other in a front-to-rear direction and cooperatively maintaining the cargo container 16 in an elevated position relative to a subjacent supporting surface 28 for the vehicle 14.

At at least one of the sides 18, 20 of the cargo container 16, the skirt assembly 12 is operatively mounted to block air flow in a lateral direction into a region between: a) the bottom of the cargo container 16 and surface 28; and b) the wheel assemblies 24, 26 thereby to maintain a smooth flow of air past the cargo container 16 as the vehicle 14 is travelling. As used herein, the reference to "blocking" is intended to indicate that a substantial amount of air flowing past the sides 18, 20 is prevented from migrating laterally inwardly at the noted regions, to the extent that the overall aerodynamic properties of the vehicle are appreciably improved by creating a configuration past which there will be a smooth/laminar flow pattern with the vehicle 14 advanced at normal operating speed. Complete blocking of this air flow cannot be practically achieved.

The vehicle 14 is shown generically in FIG. 1 to encompass virtually a limitless number of different vehicle constructions. A moving/towing component 30 may be movable as one piece with the cargo container 16. Alternatively, in a conventional semi-trailer/van construction, the cargo container 16 will be separate from the moving/towing component 30. According to the invention, the air deflecting system 10 can be incorporated into these and other types of vehicles to improve aerodynamic properties thereof. While not limited to this specific application, the inventive structure will be described hereinbelow with respect to an exemplary semi-trailer/van configuration.

Figure 4:
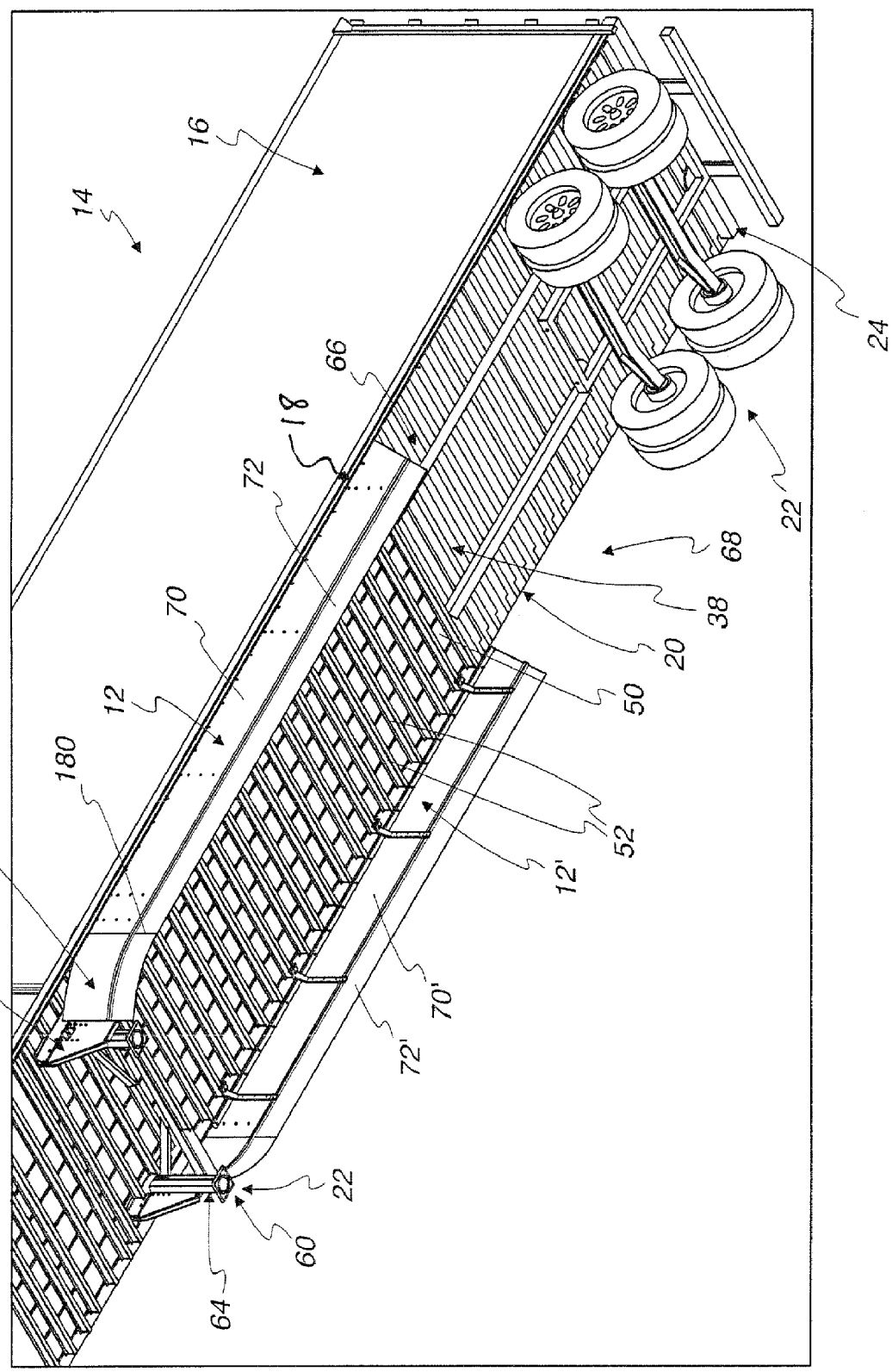
FIG. 4 is a fragmentary, bottom perspective view of the cargo container on the vehicle in FIGS. 2 and 3.
Figure 5:
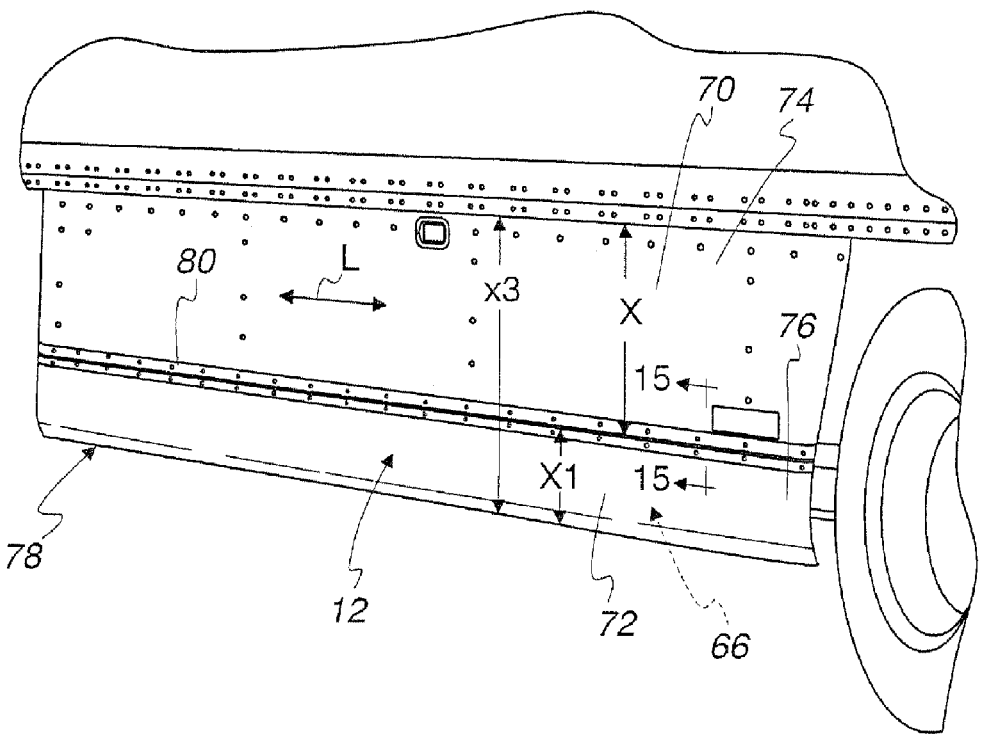
FIG. 5 is an enlarged, fragmentary, side perspective view of a portion of the cargo container in FIGS. 2-4 and showing one of the inventive skirt assemblies operatively mounted thereon.
Figure 6:
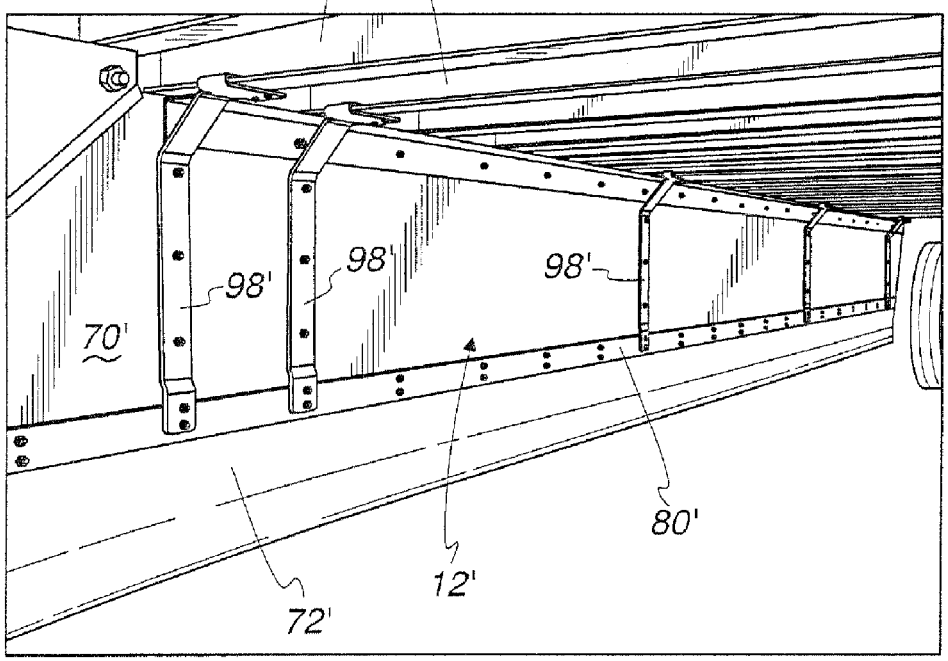
FIG. 6 is a fragmentary perspective view of the inventive side skirt assembly on the side of the cargo container opposite that in FIG. 5 and taken from underneath the cargo container.
Figure 7:
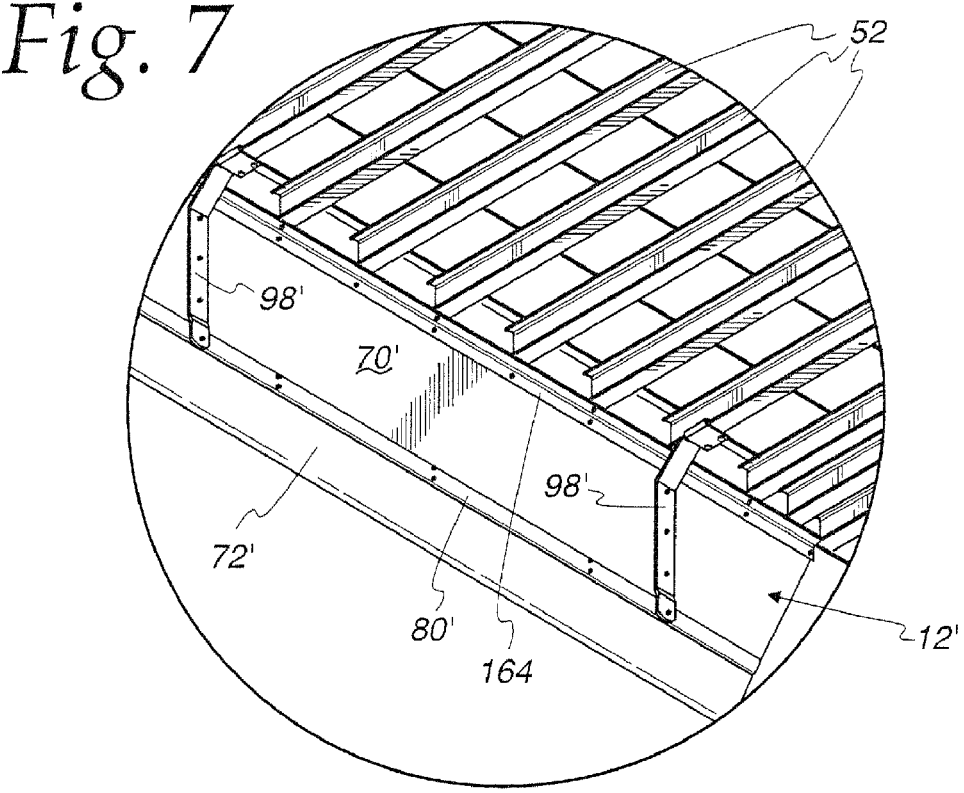
FIG. 7 is a view as in FIG. 6 from a slightly different perspective.

In FIGS. 2-4, the vehicle 14 has a cubically-shaped cargo container 16 with a front 32, a rear 34, a top 36, a bottom 38, and laterally spaced first and second sides 18, 20, respectively.

An internal cargo storage space 44 is bounded by a peripheral wall structure 46 and separate top and bottom walls 48, 50, respectively. The bottom wall 50 defines a floor for the storage space 44 and is reinforced by laterally extending, reinforcing beams 52 at regularly spaced intervals along the front-to-rear dimension of the cargo container 16.

The support 22 is defined cooperatively by a wheel assembly/carriage 24 at the rear of the cargo container 16 and a hitch assembly 54 on the moving/towing component 30 over the wheel assembly/carriage 26. The hitch assembly 54 is made up of cooperating hitch components 56, 58, respectively on the moving/towing component 30 and cargo container 16, with the former mounted above the wheel assembly 26 on the moving/towing component 30, that is spaced forwardly from the wheel assembly 24.

A landing gear 60 is provided at the front of the cargo container 16, between the wheel assemblies 24, 26, and bears against the subjacent support surface 28 to maintain the cargo container 16 in an elevated, level orientation with the cargo container 16 separated from the moving/towing component 30. The landing gear 60 consists of laterally spaced weight bearing components 62, 64, respectively inset laterally from the cargo container sides 18, 20.

The construction of the vehicle 14 to this point is conventional. With this construction, there is a first region 66 between: a) the wheel assemblies 24, 26; and b) the bottom 38 of the cargo container 16 and subjacent support surface 28, that is open at the first side 18 of the cargo container 16. A like region 68 is open at the second side 20 of the cargo container.

With the vehicle 14 in motion, air tends to be drawn by vacuum through the regions 66, 68 laterally to the space beneath the bottom wall 50 of the cargo container 16. This prevents smooth/laminar air flow past the cargo container 16 below the bottom wall 50 and also causes the air to flow against the exposed beams 52 and wheel assembly 24 so as to thereby cause significant generation of drag forces that compromise fuel efficiency.

Skirt assemblies 12, 12', which are structurally and functionally identical but mirror images of each other, are mounted, one each at the sides 18, 20, to smoothly guide front-to-rear air movement and block air flow laterally through the regions 66, 68, respectively. Since the skirt assemblies 12, 12' have the same construction, parts on the skirt assembly 12' will be identified with numbers corresponding to the parts on the skirt assembly 12, with the addition of a "'" designation.

Referring now additionally to FIGS. 5-18, further details of the structure of the skirt assemblies 12, 12', and their mounting to the vehicle 14, will be described.

The skirt assembly 12 has an upper panel 70 and a lower panel 72. Each of the panels 70, 72 extends in a front-to-rear direction and is elongate with a length extending generally parallel to the double-headed arrow, identified as L in FIG. 5, that is a front-to-rear direction.

The upper panel 70 has a laterally outwardly facing deflecting surface 74 that is smooth to guide air flow past the region 66. The lower panel 72 has a matched deflecting surface 76 that performs the same function.

The lower panel 72 is turned radially inwardly to define a curved bottom region at 78 that facilitates deflection of the lower panel 72, as in the event a foreign object is encountered during vehicle movement.

The upper and lower panels 70, 72 have a substantially constant vertical dimension X, X1, respectively, over their lengthwise extent. The vertical dimension X1 of the lower panel 72 is less than the vertical dimension X of the upper panel 70, for reasons that will be explained hereinbelow. As depicted, the dimension X1 makes up approximately 33% of the combined vertical dimension X3 for the upper and lower panels 70, 72.

It should be noted that while the upper and lower panels 70, 72 are shown as one continuous lengthwise piece, it is contemplated that two or more pieces may be combined to produce the upper panel 70 and/or the lower panel 72. For that reason, as claimed herein, the upper and lower panels will be referenced as "at least one upper panel" and "at least one lower panel."

The upper and lower panels 70, 72 are joined to each other through a connector 80 that extends preferably the full length of the upper and lower panels 70, 72. As with the panels 70, 72, the connector 80 may likewise be made of multiple pieces; however, the connector 80 depicted is shown as one piece extending over the full length of the panels 70, 72.

Figure 15:
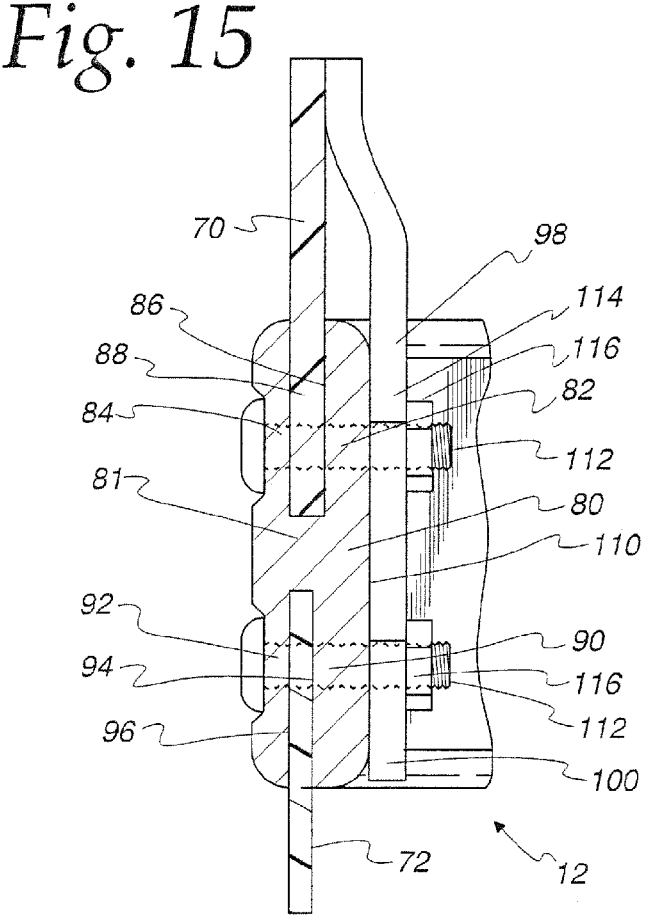
FIG. 15 is an enlarged, cross-sectional view of a connector for separate panel sections taken along line 15-15 on the skirt assembly in FIG. 5.

The connector 80 has an "H"-shaped configuration, as seen most clearly in FIG. 15. With this configuration, the connector 80 may be made through an extrusion forming process. The connector 80 has a central portion 81 from which spaced first and second legs 82, 84 project upwardly in spaced relationship. The legs 82, 84 bound an upwardly opening receptacle 86 within which the lower edge region 88 of the upper panel 70 nests. Corresponding first and second legs 90, 92 project downwardly from the central portion 81 of the connector 80 and bound a downwardly opening receptacle 94 into which an upper edge region 96 of the lower panel 72 nests. This connection is secured in a manner as will be described hereinbelow.

To mount the skirt assemblies 12, 12' to the cargo container 16, a plurality of support braces 98, 98' are used. The exemplary support brace 98', as seen in FIGS. 6-14 and 16, has a flat body 100' with oppositely facing flat surfaces 102', 104'. The surface 102' facially engages a radially inwardly facing surface 106' on the upper panel 70'. This facial engagement occurs vertically over a majority of the vertical dimension of the upper panel 70' and, as depicted, extends over most of that vertical dimension. Fasteners 108', which may be in the form of rivets or threaded screws/bolts, are used to connect the body 100' to the upper panel 70' at spaced vertical locations. With this arrangement, the support brace 98' reinforces the upper panel 70' at its mounting location.

As depicted in FIG. 15, the lower region of the corresponding body 100 on the support brace 98 is shaped to reside closely against a laterally inwardly facing connector surface 110, that locally projects laterally inwardly from the upper and lower panels 70, 72.

Separate fasteners 112, in the form of bolts, are directed into the stacked components at two vertically spaced locations. One of the upper bolts 112 is directed through the second leg 84, the lower edge region 88 of the upper panel 70, the first leg 82, and the offset portion 114 of the support brace 98, and is secured through a nut 116. A separate, lower bolt 112 is directed through the second leg 92, the lower panel 72, the first leg 90, and the offset portion 114 of the support brace 98, and is secured by a nut 116.

With this arrangement, the support braces 98, 98' rigidify the upper panels 70, 70' and additionally fix the connectors 80, 80' to the upper and lower panels 70, 72; 70', 72'. At the same time, this arrangement facilitates separation of the lower panels 72, 72' in the event that they become damaged. At the same time, the upper and lower panels 70, 72; 70', 72' are positively unified. The support braces 98, 98', in addition to this function, also are used to connect the unified panels 70, 72; 70', 72' to the cargo container 16.

As seen in FIGS. 6-14 and 16, each support brace 98' has an angled portion 118' configured so that the attached support brace 98' extends angularly between: a) the vehicle at a first location at 120 spaced laterally inwardly from the second side 20 at the bottom of the cargo container 16; and b) the upper panel 70'. The angled portion 118' reinforces the upper panel 70' at a location at 122, adjacent the top of the upper panel 70'.

The angled portion 118' extends to a first clamp part 124' that cooperates with a second clamp part 126'. The clamp parts 124', 126' are relatively movable and cooperatively make up a clamp assembly at 128'.

Each of the multiple supports braces 98' is located strategically so that the first clamp part 124' aligns with one of the reinforcing beams 52. The first clamp part 124' has a U-shaped portion 130' that opens generally horizontally to wrap around one flange edge 134.

The second clamp part 126' has a flat body 136' with ends 138', 140' that are formed to define a "U" shape in conjunction with a base portion 141' therebetween. The ends 138', 140' have the same configuration and function in the same manner. Exemplary end 138' has a curved transition region 142' between the base 141' and a clamping block 144' that it defines. The clamping block 144' has a clamping end 146' that projects horizontally beyond the transition region 142', thereby to define a downwardly facing edge 148' that is spaced above the base portion 141'.

The second clamp part 126' is situated operatively by placing the base portion 141' facially against a flat surface 150' on the first clamp part 124'. An edge 152' on the transition region 142' abuts to the flange edge 154, opposite to the flange edge 134, to consistently locate the second clamp part 126' relative to the first clamp part 124'. In this position, the edge 148' overlies the flange edge 154.

Through separate fasteners/bolts 156', the second clamp part 126' is drawn positively against the first clamp part 124' so that the flange edge 154 is captively held between the edge 148' and the flat surface 150' on the first clamp part 124'.

For additional rigidity, an edge 158' on the clamping block 144' may be configured to abut to the beam web 160'. Thus, the width of the flange 132 becomes captive between a base region 162' on the U-shaped part 130 and the edges 152', 158' on the second clamping part 126'.

Each of the support braces 98, 98' is assembled in a like manner so that the support braces 98, 98' cooperatively positively support the panels 70, 72; 70', 72'. With this arrangement, the vertically extending portions of the support braces 98, 98' attach to the upper panels 70, 70', and rigidify the upper panels 70, 70' as required to deflect air during normal operation without significant lateral deflection of the panels 70, 70'. However, in the event of an impact, this support brace construction allows a certain degree of flexing of the upper panels 70, 70' relative to the cargo container 16, thereby to potentially avoid overstressing of the panels 70, 70' or other component that might cause it to fail.

Figure 8:
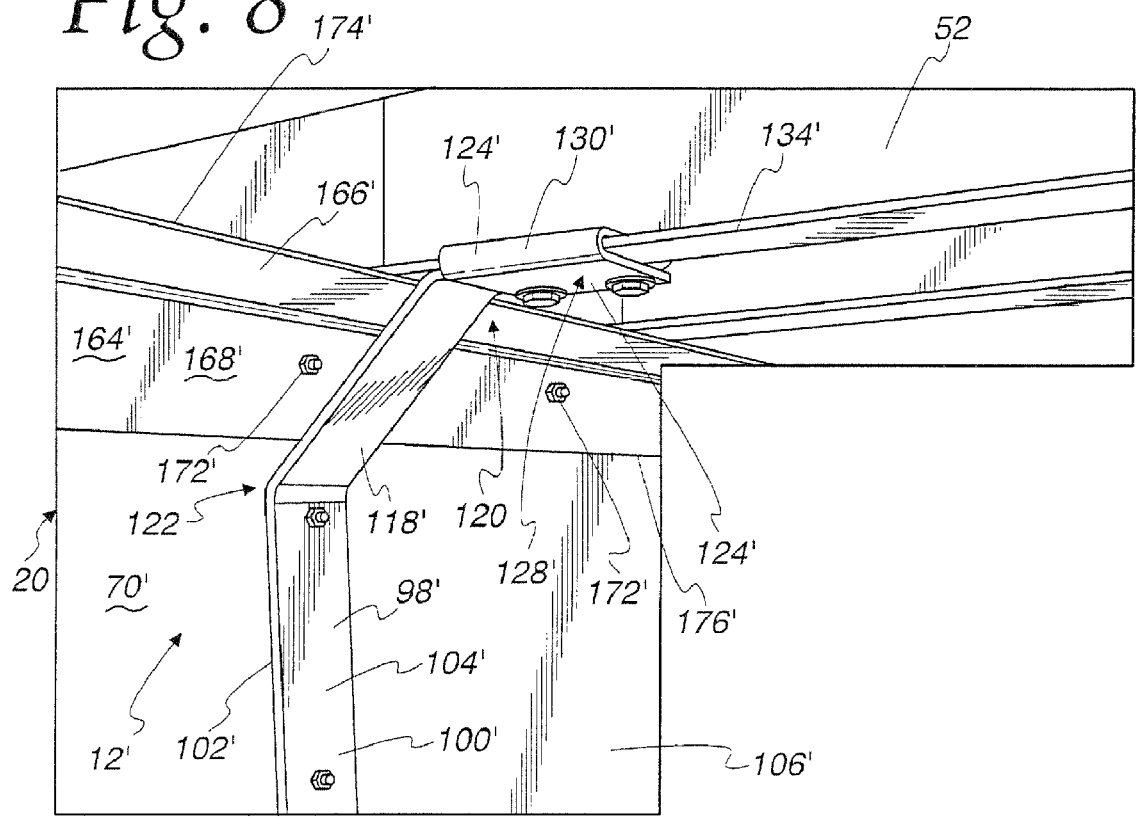
FIG. 8 is an enlarged, fragmentary, perspective view as in FIG. 6 and showing one support brace interacting with a beam on the cargo container and with separate first and second clamp parts captively engaging the beam.
Figure 9:
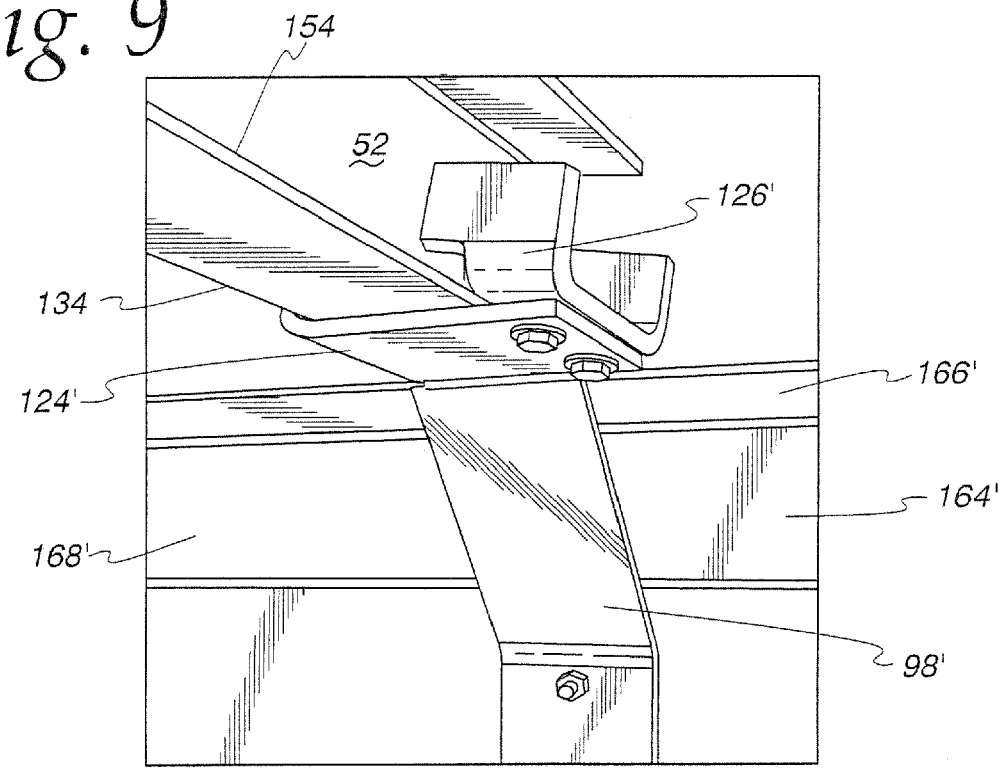
FIG. 9 is an enlarged, fragmentary view of the support brace in FIG. 8 from underneath the cargo container and from a slightly different perspective, and with the second clamp part loosely held in place.
Figure 10:
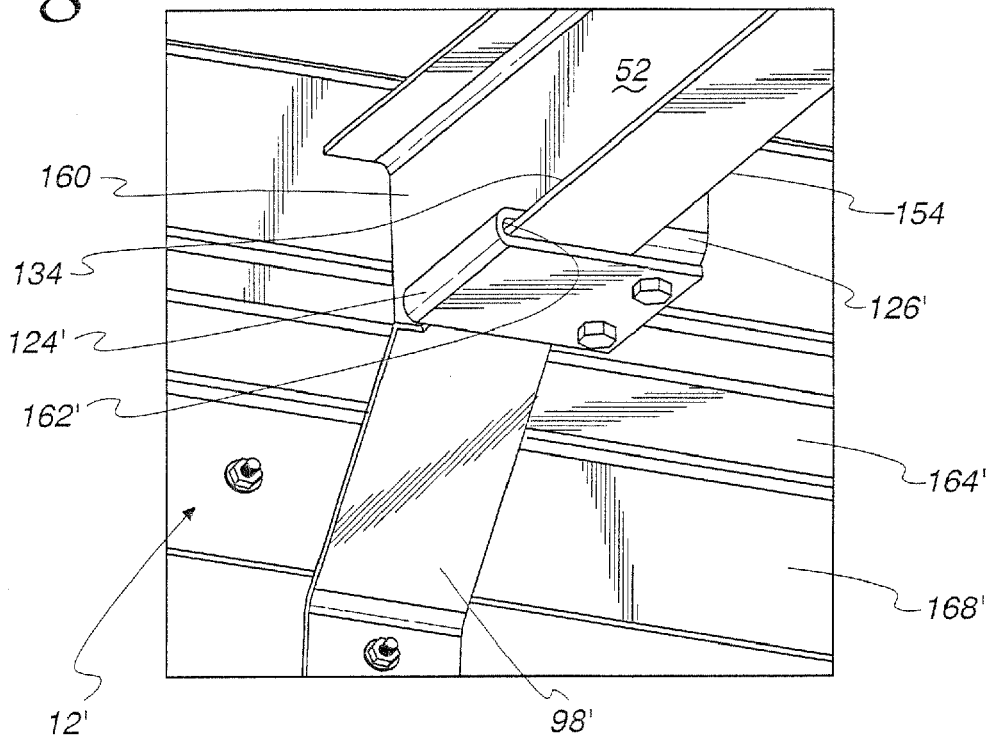
FIG. 10 is a view as in FIG. 8 from a slightly different perspective and with the second clamp part tightened to the first clamp part.
Figure 11:
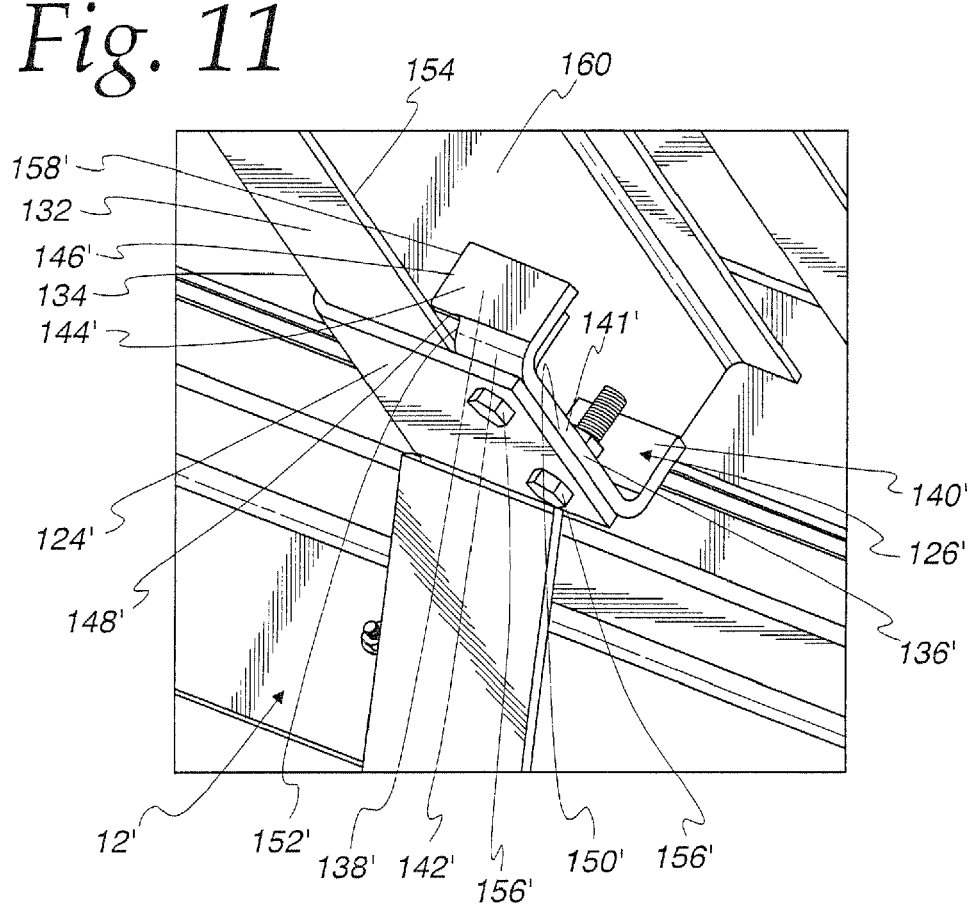
FIG. 11 is a view as in FIG. 9 with the second clamp part tightened to the first clamp part.
Figure 12:
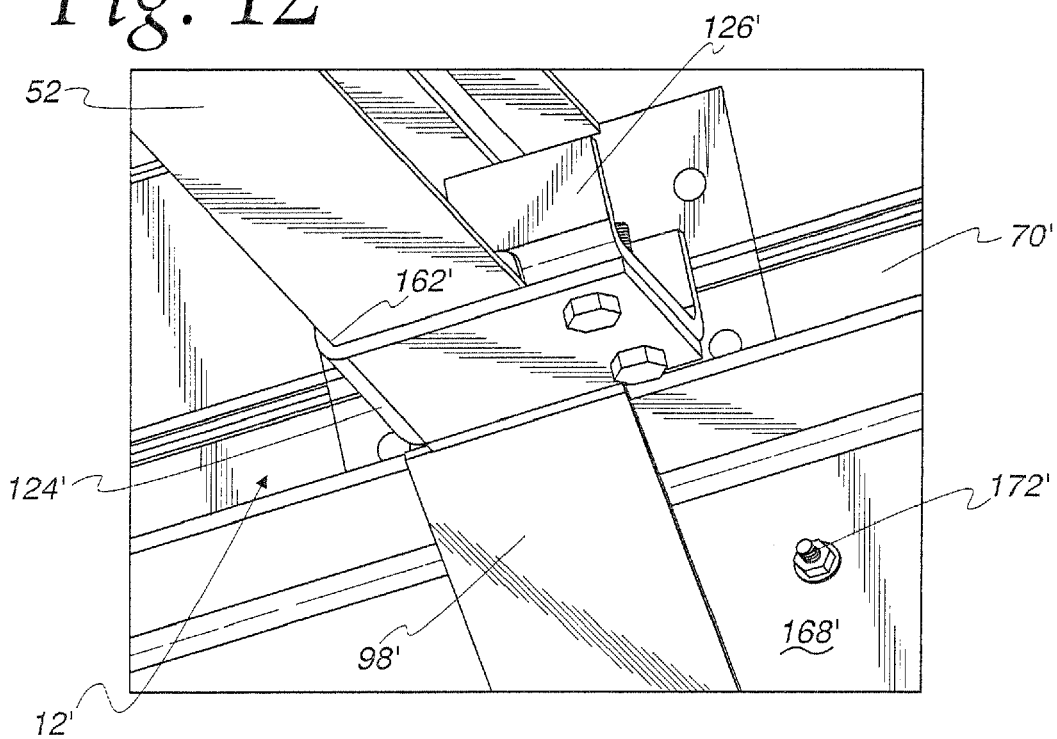
FIG. 12 is a view as in FIG. 11 from a slightly different perspective and showing the clamp parts in the FIG. 11 state.
Figure 13:
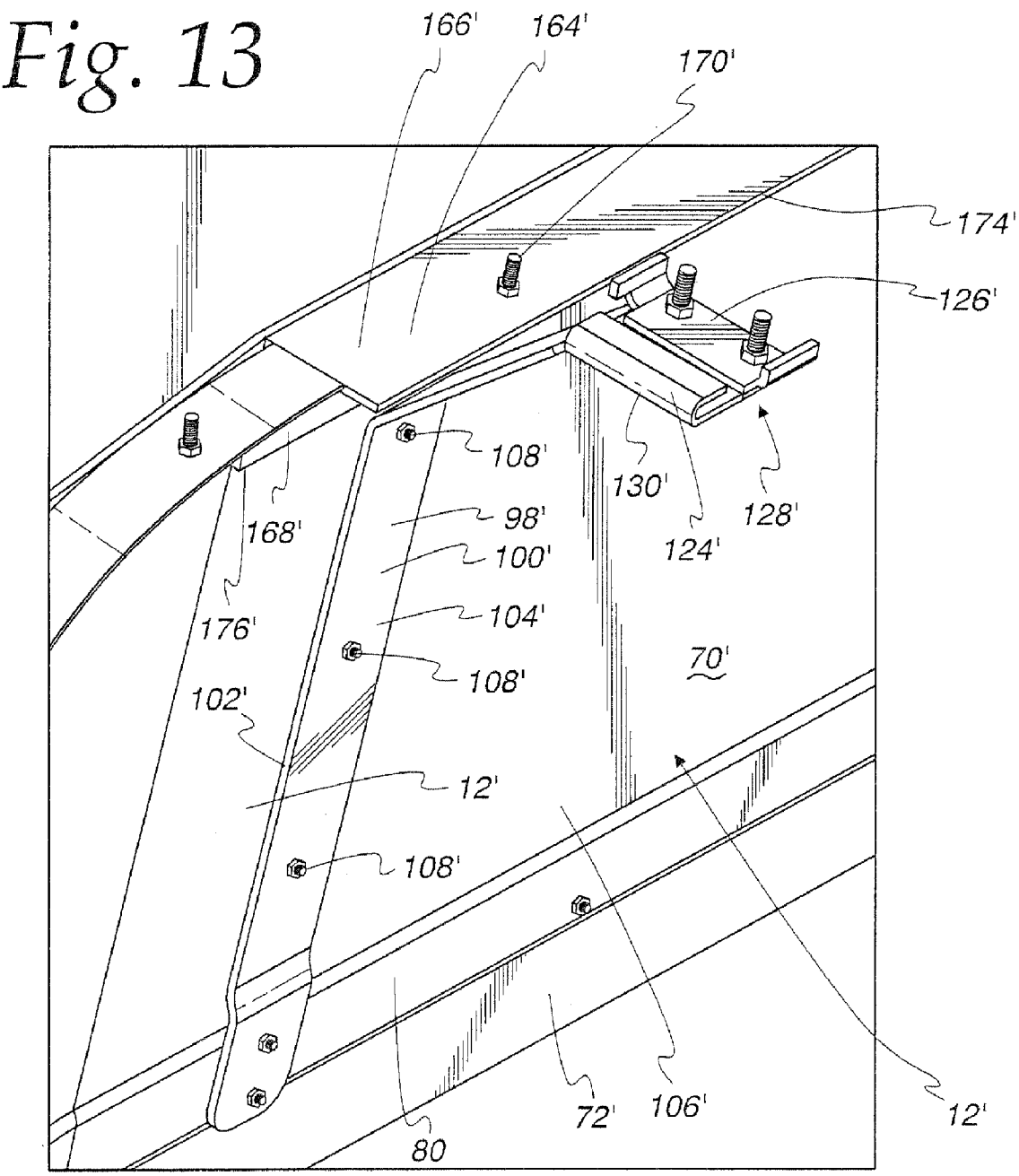
FIG. 13 is an enlarged, fragmentary, perspective view of the skirt assembly in FIG. 7 separated from the cargo container.
Figure 14:
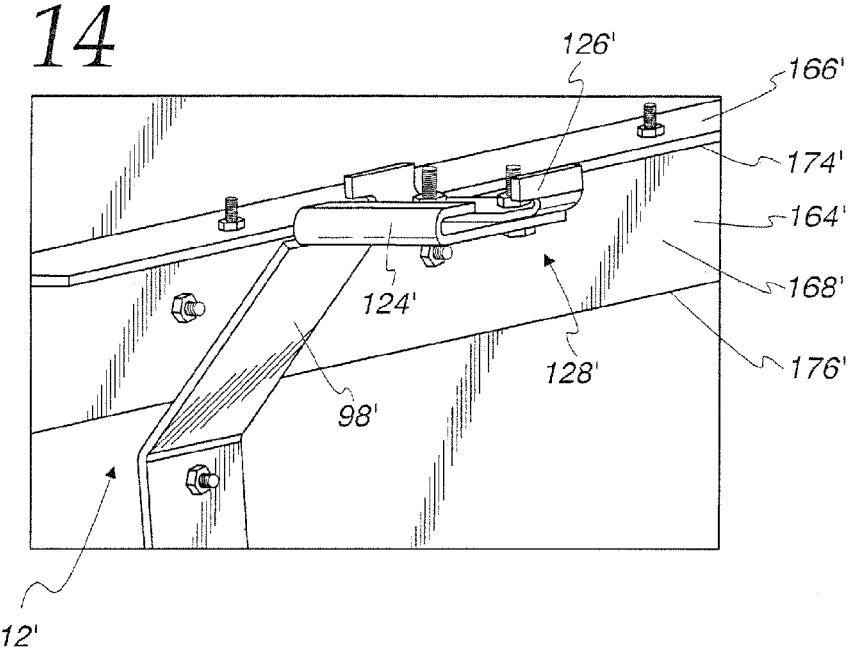
FIG. 14 is an enlarged, fragmentary view of the components in FIG. 13 from a slightly different perspective.

The connection between the upper panels 70, 70' and cargo container 16 is further rigidified by utilizing an elongate mounting component 164', as seen in FIGS. 8 and 13. The mounting component 164' consists of angled first and second generally flat walls 166', 168'. The first wall 166' is connected to a plurality of the reinforcing beams 52 and secured as by fasteners 170, that may be threaded elements such as bolts, rivets, or the like. Alternatively, the first wall 166' might be permanently fixed to the beams 52, as by welding.

The second wall 168' is secured to the upper region of the upper panel 70' using a series of fasteners 172', that may be bolts, rivets, or the like.

The elongate mounting component 164' has a length that extends in a front-to-rear direction. A single length may be employed or multiple lengths may be aligned end-to-end or with gaps therebetween.

The first and second walls 166', 168' on the elongate mounting component 164' have free edges 174', 176', respectively. The support braces 98, 98' are constructed so that the angled portions 118' span the free edges 174', 176' in adjacent relationship to each.

To add another dimension to the air deflection system 10, the front regions of the skirt assemblies 12, 12' may be extended to interact with the landing gear assembly 60.

Figure 17:
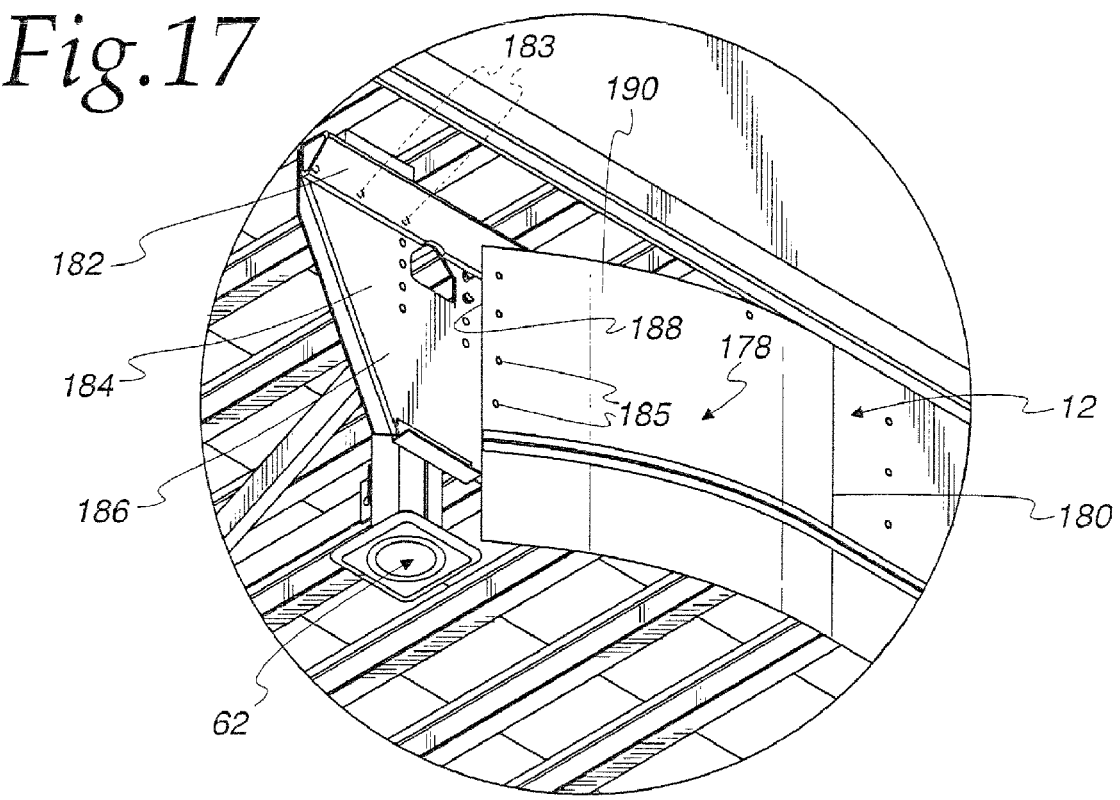
FIG. 17 is a fragmentary, perspective view of a front portion of one of the inventive skirt assemblies as it is joined to a landing gear.
Figure 18:
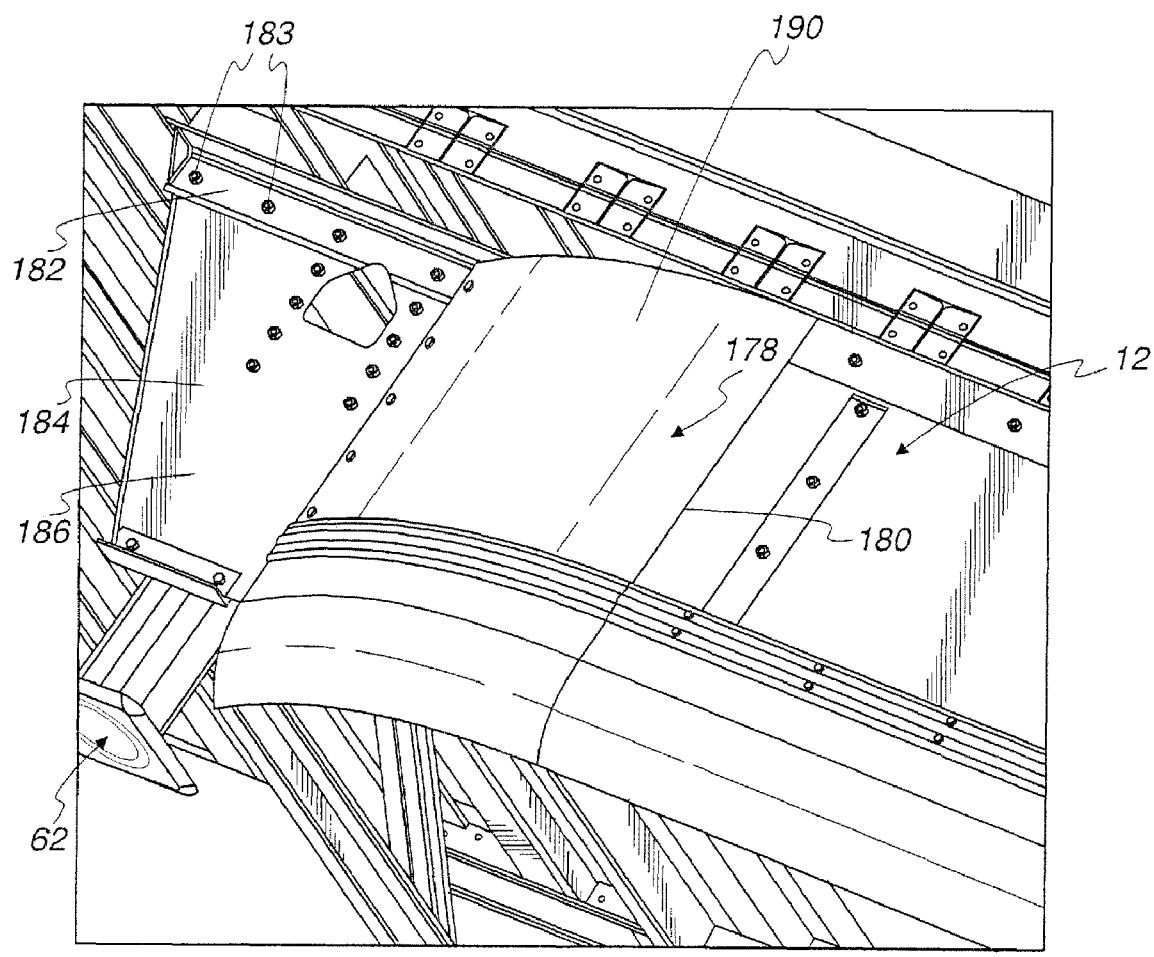
FIG. 18 is a view as in FIG. 17 from a slightly different perspective.

As shown most clearly in FIGS. 4, 17 and 18, the skirt assembly 12 has a curved portion 178 that is progressively offset laterally inwardly from a transition location at 180 continuously to the weight-bearing component 62 to which it is attached. In this embodiment, the curved portion 178 has a forwardly projecting, cantilevered mount component 182 that is secured with individual fasteners 183 to a wall 184 on the weight bearing component 62. Like fasteners 185 can be used to secure the leading edge 188 of the curved portion 178 to the weight bearing component 62. The curved portion 178 has a smooth, generally laterally facing surface 190 that progressively redirects the air flow laterally outwardly to the deflecting surfaces 74, 76 on the upper and lower panels 70, 72.

With the above-described construction, many potential advantages result from the standpoint of manufacture, installation, and repair.

With the exemplary assembly 12, the use of separate panels 70, 72 permits use of different materials for each. The lower panel 72 can be made from a rubber material that flexes readily upon being impacted as by an encountered road hazard. The lower panel 72 is at the same time sufficiently shape-retentive to guide air flow as contemplated without significant deformation.

Alternatively, the lower panel 72 may be made from the same type of material as the upper panel 70, but with a thinner construction that gives it more flexibility.

If a road hazard is encountered, it is more likely to damage the lower region of the skirt assembly 12. Should damage occur, it is possible through the release of fasteners on the connector 80 to separate the lower panel 72 and either repair it or replace it with a similar panel.

Because the lower panel 72 has a lesser vertical extent than the upper panel 70, the cost of replacement of the lower panel 72 can be kept to a minimum.

The material making up the upper panel 72 is preferably semi-rigid. By this it is meant that the upper panel 70 will substantially resist movement and flexing caused by wind and road vibrations which potentially could decrease the aerodynamic efficiency of the structure. The reinforcing function of the support braces 98 also makes it possible to use a relatively thin material for the upper panel.

In one preferred form, the upper panel 70 is made from a non-metal material that may be a plastic or a composite. One preferred composite material for this construction is sold under the trademark BULITEX™. This construction resists rot, corrosion, and mildew and has the ability to expand and contract adequately in extreme temperature conditions.

The connector 80 may also be made from a non-metal material and preferably a semi-flexible plastic. The plastic material has adequate strength to accept fasteners and securely connect the upper and lower panels 70, 72.

Further, by reason of using non-metal materials, the interacting panels 70, 72 and connector 80 will not fuse with each other, such as commonly results through the generation of rust and/or corrosion. Consequently, regardless of the conditions that the skirt assembly 12 encounters, separation of the lower panel 72 from the upper panel 70 can be easily carried out.

The combination of the support braces 98 and elongate mounting components 164 allows the upper panel 70 to be positively held in an operative position. At the same time, the described interaction of the support braces 98 with the upper panel 70 causes the upper panel 70 to be reinforced against excessive lateral shifting. Further, the configuration of the angled portions 118 is such that they permit some lateral flexing of the upper panel 70 so that it has the ability to shift adequately to avoid damage upon being impacted or upon encountering high wind loading.

The configuration of the support braces 98 is also such that they can be conveniently and economically manufactured from flat metal stock. A single piece can be utilized to define the entire support brace, with the exception of the separate, second clamp part 126. The first clamp part 124 can be bent to define the U-shaped part 130 from the single piece. The support braces 98 may be made, for example, from a hot dip galvanized high tensile steel material. The support braces 98 made in this fashion are not prone to rusting and will absorb lateral forces anticipated in operation.

Figure 16:
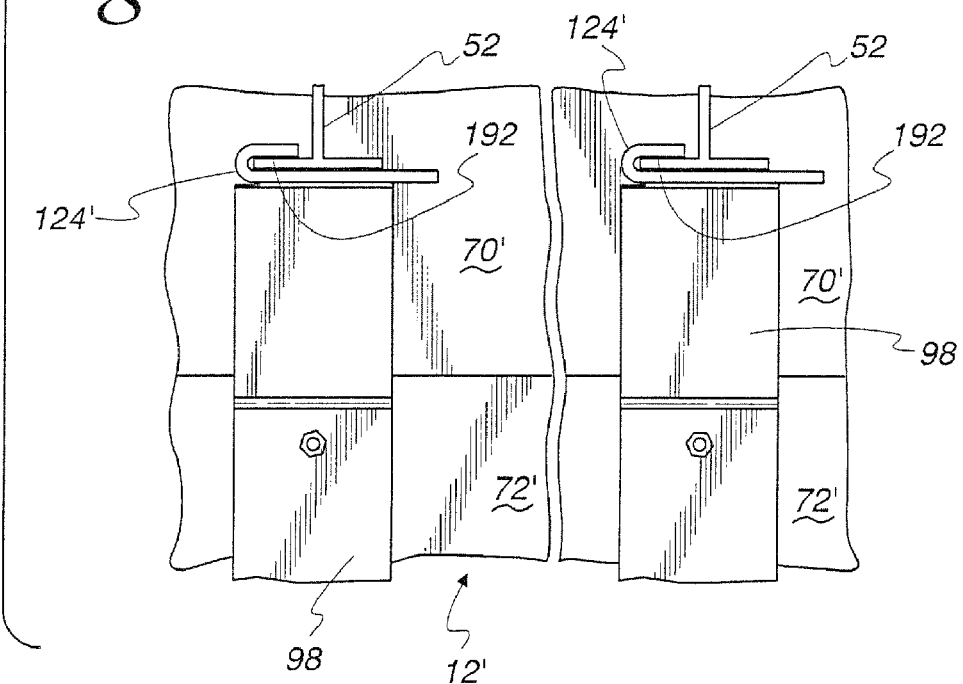
FIG. 16 is an enlarged, fragmentary, side elevation view of one of the inventive skirt assemblies hanging from a pair of beams preparatory to attaching and tightening the aforementioned second clamp parts to complete the assembly.

With the support braces 98' formed as described above, and the second clamp parts 126' loosened or separated from their respective first clamp parts 124', the joined panels 70', 72' can be preliminarily hung from any two spaced beams 52 by shifting the first clamp parts 124' horizontally to engage the beam flanges, as seen in FIG. 16, whereby these beams 52 bear upon downwardly facing surfaces 192' on the first clamp parts 124' to support the joined panels 70', 72' in an elevated operative position. Thereafter, an installer can move to different locations to install and tighten/secure the second clamp parts 126' to the first clamp parts 124' to complete the assembly process.

The foregoing disclosure of specific embodiments is intended to be illustrative of the broad concepts comprehended by the invention.

The invention claimed is:

1. In combination:
a) a vehicle comprising:
a cargo container having a front, a rear, a top, a bottom, and laterally spaced first and second sides; and
a support for the cargo container comprising first and second wheel assemblies spaced from each other in a front-to-rear direction,
the support maintaining the cargo container in an elevated position relative to a subjacent supporting surface for the vehicle so that there are first and second spaced regions between: a) the first and second wheel assemblies; and b) the bottom of the cargo container and subjacent supporting surface, respectively at the first and second sides of the cargo container; and
b) an air deflection system comprising:
a first skirt assembly mounted to the vehicle at the first side of the cargo container,
the first skirt assembly comprising:
i) at least one upper panel extending in a front-to-rear direction and defining an upper laterally facing deflecting surface; and
ii) at least one lower panel extending in a front-to-rear direction below the at least one upper panel and defining a lower laterally facing deflecting surface,
the upper and lower laterally facing deflecting surfaces blocking air flow in a lateral direction into the first region;
the at least one lower panel being constructed to be more readily bendable than the at least one upper panel so that with the first skirt assembly in an operative position the at least one lower panel will deflect upon being impacted with a predetermined force relative to the at least one upper panel,
the air deflection system further comprising a plurality of support braces extending angularly between: a) the vehicle at a first location spaced laterally inwardly from the first side at the bottom of the cargo carrying container; and b) the at least one upper panel to support the first skirt assembly in the operative position and reinforce the at least one upper panel,
wherein the at least one upper panel has a vertical dimension, the plurality of support braces comprises a first support brace comprising a flat body with oppositely facing first and second flat surfaces, the at least one upper panel has a laterally inwardly facing surface and the first support brace is secured to the at least one upper panel with the first flat surface on the body of the first support brace engaged with the laterally inwardly facing surface of the at least one upper panel over a majority of the vertical dimension of the at least one upper panel to thereby reinforce the at least one upper panel,
wherein the first support brace comprises a portion that extends angularly between the first location and the at least one upper panel adjacent to the top of the at least one upper panel.

2. The combination according to claim 1 wherein the cargo container comprises a plurality of laterally extending reinforcing beams each with a flange, the plurality of support braces comprises first and second support braces respectively comprising first and second clamp assemblies, the first and second clamp assemblies each comprising first and second relatively movable parts, the first clamp assembly parts engagable one each with one of the flanges on respective first and second spaced reinforcing beams to cooperatively releasably hang the first skirt assembly in the operative position, whereupon the second clamp assembly parts can be moved relative to the respective first clamp assembly parts to captively engage respective flanges on the first and second reinforcing beams to thereby maintain the first skirt assembly in the operative position.

3. The combination according to claim 2 wherein the first support brace comprises a single piece that defines the first clamp assembly part and engages the at least one upper panel.

4. The combination according to claim 2 wherein the first clamp assembly part comprises a U-shaped portion that opens generally horizontally to wrap around a respective flange on the first reinforcing beam.

5. The combination according to claim 1 wherein the vehicle comprises a plurality of laterally extending reinforcing beams and the first skirt assembly comprises a first elongate mounting component with a length that extends in a front-to-rear direction, the first elongate mounting component connecting to a plurality of the reinforcing beams and to the at least one upper panel.

6. The combination according to claim 5 wherein the at least one upper panel has a top and bottom, the first elongate mounting component comprises angled first and second generally flat walls, the first wall is connected to a plurality of the reinforcing beams and the second wall is connected to the at least one upper panel at the top of the at least one upper panel.

7. The combination according to claim 6 wherein the first and second walls on the first elongate mounting component respectively have first and second free edges, the plurality of support braces comprise a first support brace and the first support brace has a portion that projects angularly between the vehicle and at least one upper panel adjacent each of the first and second free edges.

8. The combination according to claim 1 wherein the vehicle comprises a landing gear assembly that is offset laterally inwardly from each of the first and second sides of the cargo carrying container and the first skirt assembly is connected to the landing gear assembly and extends over a majority of a front-to-rear dimension of the first spaced region.

9. The combination according to claim 8 wherein the at least one upper panel and at least one lower panel are shaped to extend progressively laterally inwardly in a rear-to-front direction toward the landing gear assembly.

10. The combination according to claim 1 wherein the first skirt assembly comprises at least one elongate connector having a length extending in a front-to-rear direction, the at least one connector joined to each of the at least one upper panel and the at least one lower panel, and the at least one elongate connector is made from a non-metal material, the at least one connector joined to one of the one upper panel and one lower panel using a fastener extending through the at least one elongate connector and the one of the one upper panel and one lower panel.

11. The combination according to claim 1 wherein the air deflector system further comprises a second skirt assembly that is the same as the first skirt assembly mounted to the vehicle at the second side of the cargo carrying container.

12. The combination according to claim 1 wherein each of the at least one upper panel and at least one lower panel is made from a non-metal material.

13. The combination according to claim 1 wherein the at least one upper panel and at least one lower panel each has a length extending in a front-to-rear direction and a vertical extent and the at least one lower panel and at least one upper panel each has a substantially constant vertical extent over a majority of their respective lengths and the vertical extent of the at least one upper panel is greater than the vertical extent of the at least one lower panel.

14. The combination according to claim 1 wherein one of the at least one upper panel and at least one lower panel extends as one piece over a majority of a front-to-rear dimension of the first spaced region.

15. In combination:
a) a vehicle comprising:
a cargo container having a front, a rear, a top, a bottom, and laterally spaced first and second sides; and
a support for the cargo container comprising first and second wheel assemblies spaced from each other in a front-to-rear direction,
the support maintaining the cargo container in an elevated position relative to a subjacent supporting surface for the vehicle so that there are first and second spaced regions between: a) the first and second wheel assemblies; and b) the bottom of the cargo container and subjacent supporting surface, respectively at the first and second sides of the cargo container; and
b) an air deflection system comprising:
a first skirt assembly mounted to the vehicle at the first side of the cargo container,
the first skirt assembly comprising:
i) at least one upper panel extending in a front-to-rear direction and defining an upper laterally facing deflecting surface; and
ii) at least one lower panel extending in a front-to-rear direction below the at least one upper panel and defining a lower laterally facing deflecting surface,
the upper and lower laterally facing deflecting surfaces blocking air flow in a lateral direction into the first region;
the at least one lower panel being constructed to be more readily bendable than the at least one upper panel so that with the first skirt assembly in an operative position the at least one lower panel will deflect upon being impacted with a predetermined force relative to the at least one upper panel, the air deflection system further comprising a plurality of support braces extending angularly between: a) the vehicle at a first location spaced laterally inwardly from the first side at the bottom of the cargo carrying container; and b) the at least one upper panel to support the first skirt assembly in the operative position and reinforce the at least one upper panel,
wherein the at least one upper panel has a vertical dimension, the plurality of support braces comprises a first support brace comprising a flat body with oppositely facing first and second flat surfaces, the at least one upper panel has a laterally inwardly facing surface and the first support brace is secured to the at least one upper panel with the first flat surface on the body of the first support brace engaged with the laterally inwardly facing surface of the at least one upper panel over a majority of the vertical dimension of the at least one upper panel to thereby reinforce the at least one upper panel,
wherein the first skirt assembly comprises at least one connector for joining the at least one upper panel and the at least one lower panel, the at least one connector defining a first receptacle bounded by a first upwardly extending leg and a second receptacle bounded by a first downwardly extending leg,
the first skirt assembly further comprising a first fastener that extends at least partially through each of the first support brace, the first upwardly extending connector leg and the at least one upper panel, and a second fastener that extends at least partially through each of the first support brace, the first downwardly extending connector leg and the at least one lower panel.

16. The combination according to claim 15 wherein the connector viewed in cross section has an "H" shape with an upwardly opening receptacle bounded by the first upwardly extending leg and a second upwardly extending leg and into which the at least one upper panel is directed, and a downwardly opening receptacle bounded by the first downwardly extending leg and a second downwardly extending leg and into which the at least one lower panel is directed.

17. The combination according to claim 16 wherein the first fastener extends into the second upwardly extending connector leg and the second fastener extends into the second downwardly extending connector leg.

18. A skirt assembly for a vehicle having a cargo container with a bottom and laterally spaced sides and a support comprising first and second wheel assemblies spaced from each other in a front-to-rear direction that maintain the cargo container in an elevated position relative to a subjacent supporting surface, the skirt assembly mountable in an operative position to the cargo container to block air flow at a first region at one of the sides of the cargo container between: a) the bottom of the cargo container and subjacent supporting surface; and b) the first and second wheel assemblies, the skirt assembly comprising:
i) at least one upper panel extending in a front-to-rear direction and defining an upper laterally facing deflecting surface; and
ii) at least one lower panel extending in a front-to-rear direction below the at least one upper panel and defining a lower laterally facing deflecting surface,
the upper and lower laterally facing deflecting surfaces blocking air flow in a lateral direction into the first region of an associated cargo container;
an elongate connector that viewed in cross-section has an "H" shape with upwardly and downwardly opening receptacles into which the at least one upper panel and at least one lower panel respectively are directed, the at least one lower panel being constructed to be more readily bendable than the at least one upper panel so that with the first skirt assembly in an operative position on a cargo container the at least one lower panel will deflect upon being impacted with a predetermined force relative to the at least one upper panel, the air deflection system further comprising a plurality of support braces each configured to angularly extend between: a) a first location on an associated cargo container on which the first skirt assembly is in the operative position spaced laterally inwardly from the first side at the bottom of the cargo container; and b) the at least one upper panel to support the skirt assembly in the operative position upon an associated cargo container and reinforce the at least one upper panel.

19. The skirt assembly according to claim 18 wherein the at least one upper panel has a vertical dimension, the plurality of support braces comprises a first support brace comprising a flat body with oppositely facing first and second flat surfaces, the at least one upper panel has a laterally inwardly facing surface and the first support brace is secured to the at least one upper panel with the first flat surface on the body of the first support brace engaged with the laterally inwardly facing surface of the at least one upper panel over a majority of the vertical dimension of the at least one upper panel to thereby reinforce the at least one upper panel.

20. The skirt assembly according to claim 18 wherein the cargo container comprises a plurality of laterally extending reinforcing beams each with a flange, the plurality of support braces comprises first and second support braces respectively comprising first and second clamp assemblies, the first and second clamp assemblies each comprising first and second relatively movable parts, the first clamp assembly parts engagable one each with one of the flanges on respective first and second spaced reinforcing beams to cooperatively releasably hang the first skirt assembly in the operative position, whereupon the second clamp assembly parts can be moved relative to the respective first clamp assembly parts to captively engage the flanges on the first and second reinforcing beams to thereby maintain the first skirt assembly in the operative position.

21. In combination:
a) a vehicle comprising:
a cargo container having a front, a rear, a top, a bottom, and laterally spaced first and second sides; and
a support for the cargo container comprising first and second wheel assemblies spaced from each other in a front-to-rear direction,
the support maintaining the cargo container in an elevated position relative to a subjacent supporting surface for the vehicle so that there are first and second spaced regions between: a) the first and second wheel assemblies; and b) the bottom of the cargo container and subjacent supporting surface, respectively at the first and second sides of the cargo container; and
b) an air deflection system comprising:
a first skirt assembly mounted to the vehicle at the first side of the cargo container,
the first skirt assembly comprising:
i) at least one upper panel extending in a front-to-rear direction and defining an upper laterally facing deflecting surface; and
ii) at least one lower panel extending in a front-to-rear direction below the at least one upper panel and defining a lower laterally facing deflecting surface, the upper and lower laterally facing deflecting surfaces blocking air flow in a lateral direction into the first region;

the at least one lower panel being constructed to be more readily bendable than the at least one upper panel so that with the first skirt assembly in an operative position the at least one lower panel will deflect upon being impacted with a predetermined force relative to the at least one upper panel, the air deflection system further comprising a plurality of support braces extending angularly between: a) the vehicle at a first location spaced laterally inwardly from the first side at the bottom of the cargo carrying container; and b) the at least one upper panel to support the first skirt assembly in the operative position and reinforce the at least one upper panel wherein the cargo container comprises a plurality of laterally extending reinforcing beams each with a flange, the plurality of support braces comprises first and second support braces respectively comprising first and second clamp assemblies, the first and second clamp assemblies each comprising first and second relatively movable parts, the first clamp assembly parts engagable one each with one of the flanges on respective first and second spaced reinforcing beams to cooperatively releasably hang the first skirt assembly in the operative position, whereupon the second clamp assembly parts can be moved relative to the respective first clamp assembly parts to captively engage respective flanges on the first and second reinforcing beams to thereby maintain the first skirt assembly in the operative position, wherein the first clamp assembly part comprises a U-shaped portion at all times having a fixed shape that opens generally horizontally to wrap around a respective flange on the first reinforcing beam.

22. The combination according to claim 21 wherein the U-shaped portion is defined by a single piece.

23. In combination:
a) a vehicle comprising:
a cargo container having a front, a rear, a top, a bottom, and laterally spaced first and second sides; and
a support for the cargo container comprising first and second wheel assemblies spaced from each other in a front-to-rear direction,
the support maintaining the cargo container in an elevated position relative to a subjacent supporting surface for the vehicle so that there are first and second spaced regions between: a) the first and second wheel assemblies; and b) the bottom of the cargo container and subjacent supporting surface, respectively at the first and second sides of the cargo container; and
b) an air deflection system comprising:
a first skirt assembly mounted to the vehicle at the first side of the cargo container,
the first skirt assembly comprising:
i) at least one upper panel extending in a front-to-rear direction and defining an upper laterally facing deflecting surface; and
ii) at least one lower panel extending in a front-to-rear direction below the at least one upper panel and defining a lower laterally facing deflecting surface, the upper and lower laterally facing deflecting surfaces blocking air flow in a lateral direction into the first region;

the at least one lower panel being constructed to be more readily bendable than the at least one upper panel so that with the first skirt assembly in an operative position the at least one lower panel will deflect upon being impacted with a predetermined force relative to the at least one upper panel, the air deflection system further comprising a plurality of support braces extending angularly between: a) the vehicle at a first location spaced laterally inwardly from the first side at the bottom of the cargo carrying container; and b) the at least one upper panel to support the first skirt assembly in the operative position and reinforce the at least one upper panel, wherein the vehicle comprises a plurality of laterally extending reinforcing beams and the first skirt assembly comprises a first elongate mounting component with a length that extends in a front-to-rear direction, the first elongate mounting component connecting to a plurality of the reinforcing beams and to the at least one upper panel.

24. The combination according to claim 23 wherein the at least one upper panel has a top and bottom, the first elongate mounting component comprises angled first and second generally flat walls, the first wall is connected to a plurality of the reinforcing beams and the second wall is connected to the at least one upper panel at the top of the at least one upper panel.

* * * * *